United States Patent [19]

Strasser et al.

[11] 4,262,931
[45] Apr. 21, 1981

[54] AIR BAG RESTRAINT SYSTEM

[75] Inventors: Robert A. Strasser, Livonia; Richard B. Case, Monroe, both of Mich.

[73] Assignee: Ford Motor Company, Dearborn, Mich.

[21] Appl. No.: 76,710

[22] Filed: Sep. 18, 1979

[51] Int. Cl.³ .............................................. B60R 21/02
[52] U.S. Cl. .................................... 280/729; 280/730; 280/739; 280/743
[58] Field of Search ............... 280/728, 729, 730, 732, 280/739, 743, 742

[56] References Cited

U.S. PATENT DOCUMENTS

| 3,617,073 | 11/1971 | Landsman et al. | 280/728 |
| 3,768,830 | 10/1973 | Hass | 280/729 |
| 3,784,223 | 1/1974 | Hass et al. | 280/730 |
| 3,801,126 | 4/1974 | Knight et al. | 280/732 |
| 4,076,277 | 2/1978 | Kuwakado et al. | 280/738 |

FOREIGN PATENT DOCUMENTS 2109637  9/1972  Fed. Rep. of Germany ........... 280/729

Primary Examiner—David M. Mitchell
Attorney, Agent, or Firm—John J. Roethel; Clifford L. Sadler

[57] ABSTRACT

An air bag restraint system including a unitary flexible bag having a plurality of compartments. The air bag in deflated condition is confined in a vehicle passenger compartment in spaced relationship to one of the adjacent passenger seating positions. The bag is inflatable for passenger restraint purposes by a pressurizing device. The bag is constructed and arranged so that during inflation it deploys towards one of the passenger seating positions, and also expands laterally across the vehicle interior in front of the adjacent passenger seating position.

5 Claims, 3 Drawing Figures

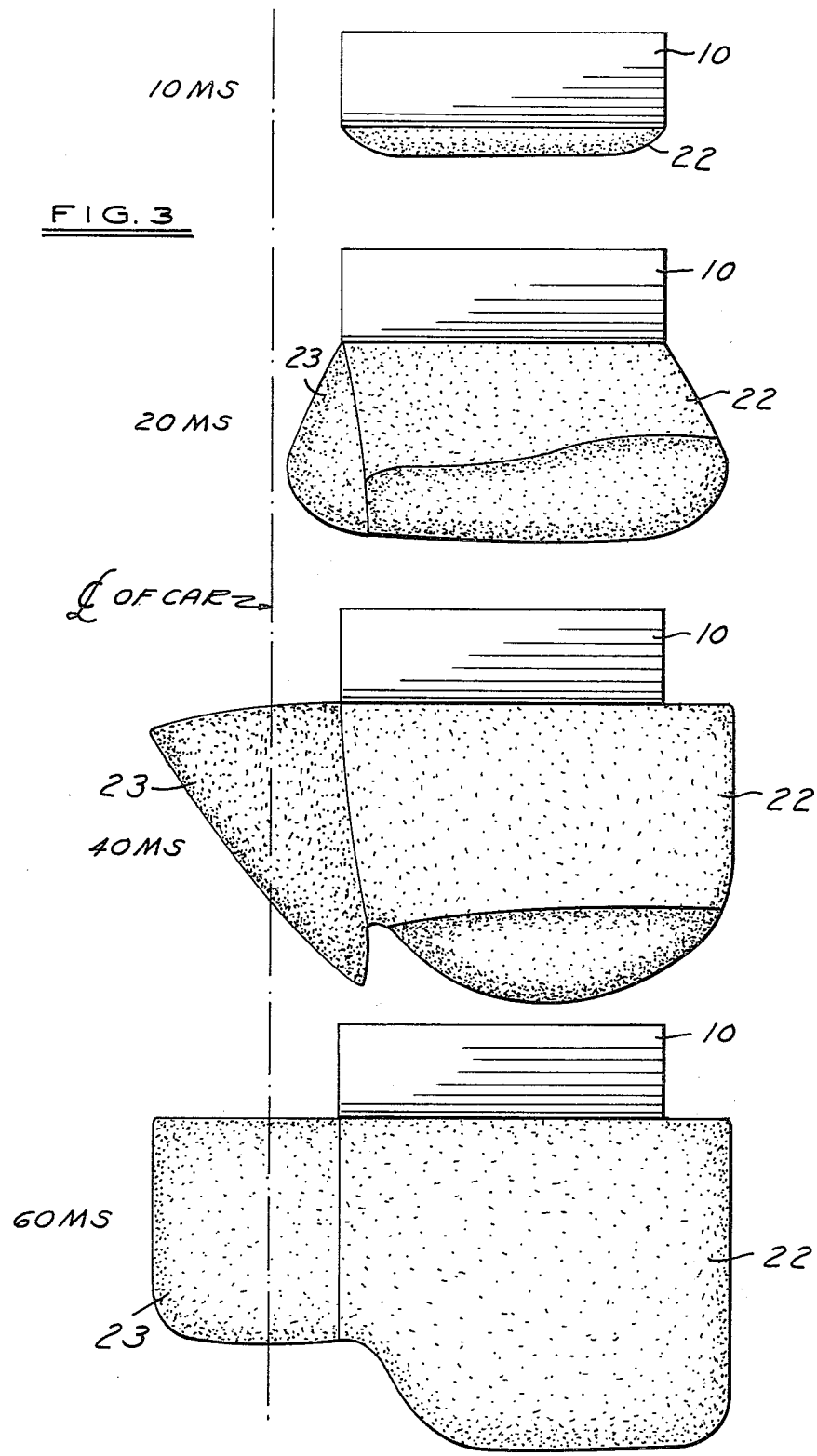

AIR BAG RESTRAINT SYSTEM

BACKGROUND OF THE INVENTION

The present invention relates to the field of air bag restraint systems for protecting vehicle occupants against severe injuries when the vehicle is involved in an impact type accident.

In an air bag system installation for a conventional left-hand drive vehicle, the vehicle occupant sitting in the right front seating position may be protected by an air bag that is deployable from a housing in the dashboard or instrument panel. The vehicle operator or driver sitting in the left front seating position, the position behind the steering wheel, may be protected by a mini-air bag system integrated in the steering wheel structure.

The placement of the air bag module for the protection of the occupant in the right-hand seating position is preferably at the right outboard end of the instrument panel, in the area that in a non-air bag vehicle is occupied by a storage compartment, more popularly called a glove box. This is because the instrument panel from the driver's end to a point well past the center is occupied by the vehicle instrumentation such as the speedometer, odometer, fuel gauge, temperature gauge and the like, the radio, the heating and ventilation controls, and the ashtray. This presents no problem in a vehicle having only two front seating positions such as a vehicle having bucket seats. In a vehicle in which the front seat is a bench type seat able to accommodate a person between the vehicle operator and the right front passenger, the occupant of the center seating position may not be afforded any protection since the center seating position would be located between the driver's air bag and the right front seating position air bag.

U.S. Pat. No. 3,617,073 issued Nov. 2, 1971 to Landsman et al for an "Automobile Safety System", discloses an air bag system in which the air bags are deployed from receivers located on the side post alongside the windshield, and also in receptacles along the interior of the doors across the body of the driver and the passengers.

In this proposed construction and arrangement, the center seating position is substantially aligned with the ends of the bags and provides minimal resistance to forward movement of the center seating position occupant. The bags that are ejected or deployed from the receivers in the vehicle door are not backed up after inflation by the vehicle instrument panel or dashboard structure.

U.S. Pat. No. 3,784,223 issued to D. P. Hass on Jan. 8, 1974 for a "Safety Apparatus", discloses an elongate air bag that appears to be able to span the center and right-hand seating positions to restrain the occupants against forward movement during an accident. It appears, however, that the air bags are stored in a chamber which extends across the full width of the vehicle and thus would not be adaptable to a system in which the collapsed air bag would be stored in a housing located in the instrument panel area usually occupied by the glove box. With the current trend toward the downsizing of vehicles that is now in vogue, the packaging of the necessary air bag system components for a system as proposed by this patent would present great difficulty.

SUMMARY OF THE INVENTION

The present invention relates to an integral air bag restraint system for restraining movement of passengers seated in the outboard and center passenger seating positions of the front seat of a motor vehicle. As used herein, passenger seating position refers to the seat positions other than that of the vehicle operator which is behind the steering wheel.

The restraint system includes a housing in the vehicle spaced forwardly of and substantially in alignment with the outboard passenger seating position. A flexible bag having a plurality of compartments is, when in a deflated condition, confined within the housing. A pressurizing means contained within the housing is actuatable to pressurize and inflate the flexible bag.

In accordance with the present invention, the bag upon inflation deploys from the housing and expands toward the outboard passenger seating position and also laterally across the interior of the vehicle in front of the center seating position. When inflated, the several bag compartments provide knee restraint and torso and head restraints for the passengers occupying the outboard and center passenger seating positions.

DESCRIPTION OF THE DRAWINGS

Other objects, advantages and features of the present invention will become more apparent as the description proceeds, reference being had to the accompanying drawings, wherein:

FIG. 3 is a view illustrating the various stages that the air bag goes through as it deploys from its stored and non-inflated condition to a fully deflated condition as viewed from the top.

DESCRIPTION OF THE INVENTION

Figure 1:
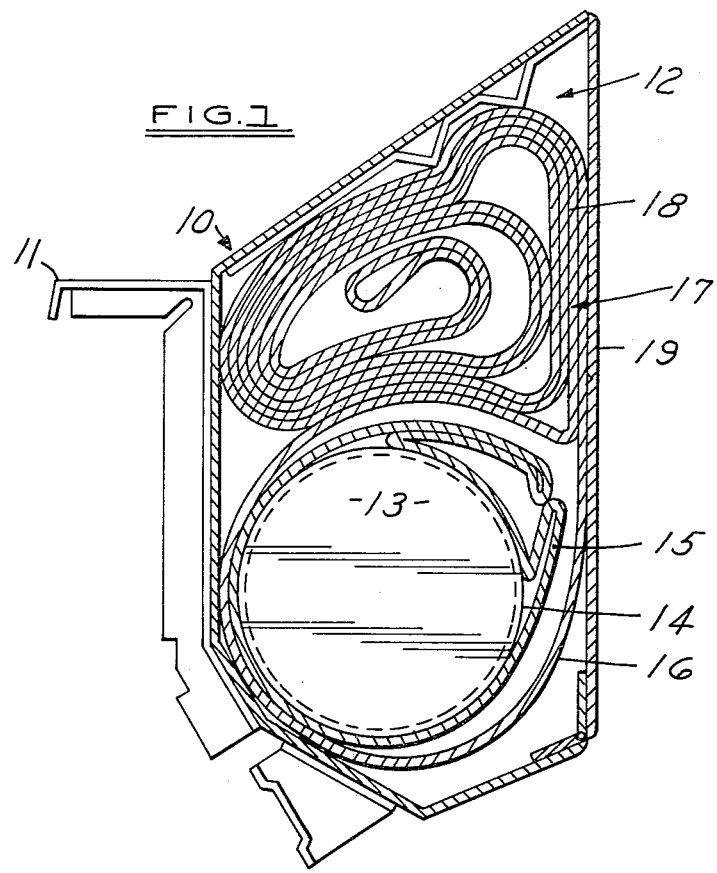
FIG. 1 is a side elevational view in cross-section of a motor vehicle passenger air bag restraint system showing the air bag in deflated condition within a housing.
Figure 2:
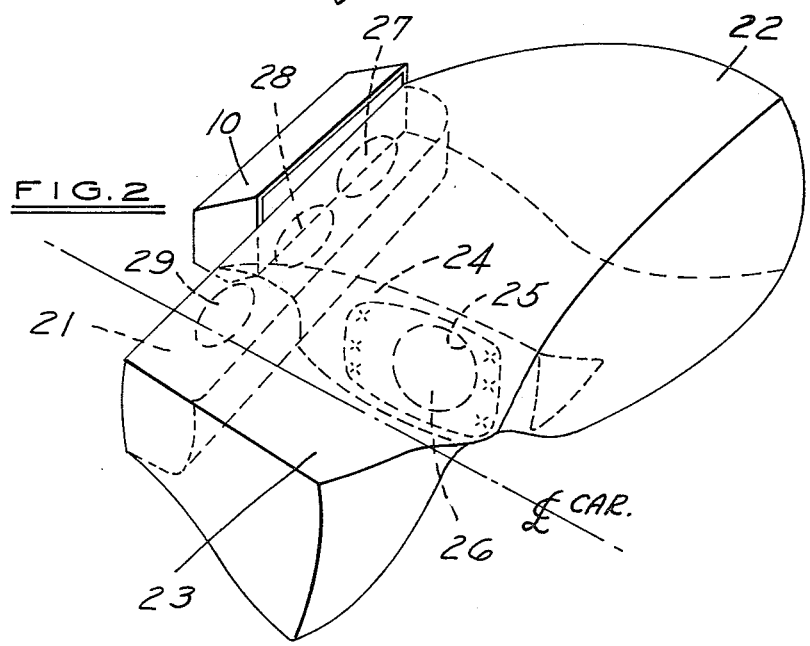
FIG. 2 is a perspective view of the air bag as it appears in fully deployed and inflated condition.

Referring now to the drawings, and in particular to FIGS. 1 and 2, the numeral 10 denotes a box-like reaction housing mounted on a structural component 11 of a vehicle instrument panel or dashboard. In effect, the reaction housing 10 substitutes for the storage compartment, more popularly known as the glovebox, that conventionally is located at the right end of the instrument panel of a left-hand drive vehicle. By left-hand drive, it is meant the vehicle has its steering wheel at the left side of the front passenger compartment, or to the left of the vehicle center line, as viewed in FIG. 2. Housing 10 is shown at the right side of the vehicle center line and is positioned so that it lies substantially in alignment with the right-hand passenger outboard seating position.

With reference to passenger seating positions, a vehicle passenger compartment having bucket or individual seats has one seating position, the left one in a left-hand drive vehicle, behind the steering wheel; and another, or right one, contiguous to the right side of the vehicle. There is no center seating position between the two. In a vehicle passenger compartment having a bench seat extending laterally across the full width of the compartment, the seating positions are a left outboard seating position contiguous to the left side body panel and behind the steering wheel, a right outboard seating position contiguous to the right side body panel, and a center seating position substantially at the center line of the vehicle.

FIG. 1 schematically depicts the air bag module, generally designated 12, embodied in the present invention as it appears when the air bag is in a stored or deflated condition. The air bag module 12 comprises a cylindrical diffuser assembly 13 housing a bag pressurizing mechanism or inflator (not shown). The inflator is a unit containing the firing mechanism and the gas generating chemicals for inflating the bag, none of the specifics of which form a part of the present invention. The cylindrical diffuser assembly 13 preferably is covered on its exterior surface 14 with a suitable heat shield.

The diffuser assembly 13 is located in the lower half of the housing 10 and is encased in a nylon knee bag portion 15, the latter being protected by the heat shield on the surface 14 of the cylinder of the diffuser assembly. The knee bag portion 15 in turn is encased or integrated within the lower longitudinally extending base portion 16 of the air bag 17. The main body portion 18 of the air bag 17 is folded into the upper half of the housing 10. The air bag module is sealed within the housing by a frangible cover 19 that is exposed to the interior of the vehicle compartment and faces the front seat.

Upon actuation of the inflator within the diffuser assembly 13, as occurs when impact sensors mounted on the vehicle register a high rate of deceleration as results from a collision, the air bag 17 is inflated and achieves the configuration shown in FIG. 2. The air bag when fully inflated extends from the right or outboard end of the housing 10 to a point beyond the center line of the vehicle. The air bag has three compartments, 21, 22 and 23, that form the passenger restraints or impact cushioning means. Compartment 21 extends the full lateral length of the air bag and is the result of the inflation of the knee bag portion 15. Compartments 22 and 23 are the result of the inflation of the main body portion 18 of the air bag. This main body portion preferably is laterally divided into the two compartments 22 and 23 by a common wall or baffle 24. The wall has an aperture 25 therein covered by a flap 26 that functions as a valve permitting flow from the compartment 22 to the compartment 23, but not in the reverse direction. The compartment 22 is positioned to be in substantial alignment with the outboard, right side passenger seating position. The compartment 23 substantially straddles the center line of the vehicle and is aligned with the center seating position.

It will be noted that the knee bag compartment 21, which is in direct communication with the diffuser assembly 13, is in communication with the compartments 22 and 23 through apertures 27, 28 and 29 in its upper surface.

No relief valves are shown in the air bag to permit controlled deflation of the same after the bag has served its purpose in decelerating the forward movement of the seat occupants. This is because air bag materials now available have sufficient permeability so that the inflating gas can permeate at a rate sufficient to attain the desired rate of collapse.

Because of the permeability of the air bag material, the internal flap valve 25 has an important function. It will be noted that the compartment 23 is somewhat smaller than the compartment 22. Therefore, as the inflating gas flows outwardly through the bag walls, the pressure in the smaller compartment 23 tends to fall faster than that in the larger volume compartment 22.

As the pressure differential between the two compartments increases, the flap valve 25 opens to permit gas flow from the larger compartment 22 to the smaller compartment 23 to maintain the pressure in the two compartments substantially equalized.

Actually, upon initial inflation of the air bag, inflating gas is received by the smaller compartment 23 from the knee bag 15 through the aperture 29 and also from the large compartment 22 through the flap valve 25. After full inflation of the air bag is achieved, the flap valve 25 functions as described to maintain the pressure in the two compartments 22 and 23 equalized.

Referring now to FIG. 3, there is shown in plan view the various stages that the air bag goes through as it is inflated from its deflated condition in the housing to its fully deployed and inflated condition.

Starting at the top of FIG. 3, at 10 milliseconds after the gas generating mechanism is actuated, the expanding air bag 17 will have forced its way through the frangible cover 19 on the housing and have started to expand from the housing 10 toward the outboard seating position.

At 20 milliseconds, the bag will have extended about half-way toward the outboard seating position and will show signs of lateral expansion toward the center line of the vehicle. This is because the knee bag portion 15 will have begun to move laterally after having cleared the housing 10 and gas will be flowing through the aperture 29 in the upper surface of the knee bag compartment 23, as well as through the apertures 27 and 28 through which gas has already been flowing into the bag compartment 22.

At 40 milliseconds, the bag compartment 22 will be approaching full volume and the compartment 23 will have been pulled by the laterally expanding kneed bag compartment 21 a substantial distance across the vehicle center line.

At 60 milliseconds, all bag compartments will have reached full volume and design configuration. Reference may be made to the lower view in FIG. 3 for the final configuration of the compartments 22 and 23; reference may also be made to FIG. 2 for the final configuration of the knee bag compartment 21.

It will be understood, however, that at 60 milliseconds, the vehicle occupants will have begun to impact the bag causing deformation of the compartments and the desired impact cushioning effect which provides the knee restraint and the upper torso and head restraints to protect the seat occupants against injury.

It is to be understood this invention is not limited to the exact construction illustrated and described above, but that various changes and modifications may be made without departing from the spirit and scope of the invention as defined in the appended claims.

We claim:

1. An air bag restraint system for restraining movement of passengers seated in front seating positions, except the seating position behind the steering wheel, of a motor vehicle,
   the restraint system including:
   a flexible bag confined within the vehicle in a normally deflated condition,
   the bag being spaced forwardly of the passenger seating positions,
   a pressurizing means contained within the vehicle in communication with the flexible bag,
   the pressurizing means being actuatable to force pressurized gas into the bag to urge the latter from deflated to inflated condition for passenger restraint purposes, the bag having a plurality of compartments therein and being constructed and arranged so that during inflation it deploys toward the passenger seating position farthest away from the excepted seating position and also expands laterally across the interior of the vehicle in front of the seating position between the seating position farthest from the excepted position and the latter, when inflated, the plurality of compartments in the air bag forming a first cushioning means extending the full lateral length across the bottom of the bag to provide knee restraint and second and third cushioning means across the top of the bag to provide upper torso restraints for passengers in the seating positions other than the excepted seating position, the air bag material being permeable to permit flow of pressurized gas through the compartment walls to the atmosphere and the bag to collapse at a controlled rate, the second and third impact cushioning means having a common wall therebetween, the third impact cushioning means being of smaller volume than the second impact cushioning means, and the common wall having a one-way flap valve therein operable to equalize pressure between the second and third impact cushioning means when pressure in the second impact cushioning means exceeds that in the third impact cushioning means during collapse of the bag.

2. An air bag restraint system for restraining movement of passengers seated in the outboard and center passenger seating positions of the front seat of a motor vehicle, the restraint system including:

a housing in the vehicle spaced forwardly of and substantially in alignment with the outboard passenger seating position, a unitary, flexible bag having a plurality of compartments and in deflated condition being confined within the housing, a pressurizing means contained within the housing actuatable to pressurize and inflate the flexible bag, the plurality of compartments in the air bag comprising a first compartment constructed and arranged to form a first impact cushioning means extending the full lateral length across the forward bottom of the bag and adapted when fully inflated to provide knee impacting restraint for passengers in the outboard and center seating positions, and laterally side-by-side second and third compartments constructed and arranged so that when fully inflated they form second and third impact cushioning means above the first compartment means to provide upper torso and head restraints for passengers in the outboard and center passenger seating positions, respectively, upon inflation, the compartment forming the impact cushioning means providing knee restraint being the first compartment to deploy from the housing and after entering the space between the housing and the outboard seating position expanding laterally across the front of the seating positions and pulling the second and third compartments into their respective restraint positions.

3. An air bag restraint system according to claim 2, in which:

the pressurizing means is enveloped within the housing by the first compartment of the bag, the first compartment having apertures therein in communication with the second and third compartments to permit the flow of pressurizing medium from the pressurizing means through the first compartment into the second and third compartments.

4. An air bag restraint system according to claims 2 and 3, in which:

the second and third compartments have a dividing wall therebetween, and a flap valve opening from the second compartment into the third compartment operable to equalize the pressure in the compartments when the pressure in the second compartment exceeds that in the third compartment.

5. An air bag restraint system according to claim 2, in which:

the expanded volume of the third compartment is smaller than that of the second compartment.

* * * * *